US012585747B2

(12) United States Patent
Eltoft

(10) Patent No.: US 12,585,747 B2
(45) Date of Patent: Mar. 24, 2026

(54) USER AUTHENTICATION AND SPOOF DETECTION FOR DEVICES USING FINGERPRINT SENSOR AND ADDITIONAL DEVICE SENSORS

(71) Applicant: Google LLC, Mountain View, CA (US)

(72) Inventor: Justin Douglas Eltoft, Pleasant Prairie, WI (US)

(73) Assignee: Google LLC, Mountain View, CA (US)

( * ) Notice: Subject to any disclaimer, the term of this patent is extended or adjusted under 35 U.S.C. 154(b) by 57 days.

(21) Appl. No.: 18/797,282

(22) Filed: Aug. 7, 2024

(65) Prior Publication Data

US 2026/0044585 A1    Feb. 12, 2026

(51) Int. Cl.
| | |
|---|---|
| *G06F 21/32* | (2013.01) |
| *G06F 3/04883* | (2022.01) |
| *G06V 40/13* | (2022.01) |
| *G06V 40/40* | (2022.01) |

(52) U.S. Cl.
CPC .......... *G06F 21/32* (2013.01); *G06F 3/04883* (2013.01); *G06V 40/13* (2022.01); *G06V 40/40* (2022.01)

(58) Field of Classification Search
CPC ..... G06F 21/32; G06F 3/04883; G06V 40/13; G06V 40/40
See application file for complete search history.

(56) References Cited

U.S. PATENT DOCUMENTS

| | | | | |
|---|---|---|---|---|
| 2008/0072063 | A1* | 3/2008 | Takahashi | H04L 9/3231 |
| | | | | 713/186 |
| 2015/0242605 | A1* | 8/2015 | Du | G06F 21/32 |
| | | | | 726/7 |
| 2017/0053108 | A1* | 2/2017 | Jakobsson | G06F 21/32 |
| 2018/0285544 | A1* | 10/2018 | Chang | G06V 40/172 |
| 2020/0184191 | A1* | 6/2020 | Thompson | G06V 40/1365 |
| 2021/0133424 | A1 | 5/2021 | Sohn et al. | |
| 2021/0342008 | A1 | 11/2021 | Sachidanandam et al. | |
| 2022/0350707 | A1 | 11/2022 | Hu et al. | |
| 2023/0114650 | A1* | 4/2023 | Keith, Jr. | G06F 21/316 |
| | | | | 726/7 |
| 2023/0237134 | A1* | 7/2023 | Douglas | G06F 21/316 |
| | | | | 713/186 |

* cited by examiner

*Primary Examiner* — Techane Gergiso
(74) *Attorney, Agent, or Firm* — IP Spring

(57) ABSTRACT
Implementations relate to user authentication and spoof detection for a device using a fingerprint sensor and additional device sensors. In some implementations, a computer-implemented method includes analyzing a fingerprint image from a fingerprint sensor of a device, to determine fingerprint detection score(s). If these scores meet fingerprint validity thresholds by greater than a respective particular range, a positive authentication indication is provided. Respective sensor data is obtained from additional sensors of the device, such as an inertial measurement unit, ambient light sensor, proximity sensor, touchscreen, etc. If one or more fingerprint detection scores meet their fingerprint validity thresholds within the respective particular range, respective context scores are determined for the sensor data of each additional sensor. If the context scores meet respective context validity thresholds, the positive authentication indication is provided, or otherwise a negative authentication indication is provided.

20 Claims, 3 Drawing Sheets

YourBank Security
Touch to sign in and
view your accounts

USER AUTHENTICATION AND SPOOF DETECTION FOR DEVICES USING FINGERPRINT SENSOR AND ADDITIONAL DEVICE SENSORS

BACKGROUND

Many electronic devices, including smartphones, include sensor-based authentication to enable the device to verify that a user attempting to gain access to the functions and data of the device is the authorized (e.g., owner) user of the device, and to prevent such access if the user is not so verified. Sensor-based authentication includes biometric authentication, performed with user permission, in which biometric features of the user are detected and compared to biometric profile data stored on the device. Biometric authentication commonly includes face detection and fingerprint sensing that are performed using sensors on the device that capture images of the face or fingerprint of the user to compare to the profile data.

Sensor-based authentication may be vulnerable to spoofing, where an attacker presents a false image or instrument to the authentication sensor to try to gain unauthorized access to the device. For example, spoofing attacks may use 2D copies of fingerprints (e.g., printed on a material) of an authorized user, 3D models or copies of fingers of the authorized user, or other attack instruments. Spoofing detection algorithms are commonly used to detect such spoofing attacks, where a fingerprint image captured by the fingerprint sensor is analyzed for characteristics indicative of spoofing (e.g., lighting, blurriness, etc.). However, spoofing detection may be vulnerable to some types of attacks, e.g., some types of instruments may be difficult for the spoofing detection to detect as spoofs.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to user authentication and spoof detection for devices using a fingerprint sensor and additional device sensors. In some implementations, a computer-implemented method includes obtaining a fingerprint image from a user using a fingerprint sensor of a device; analyzing the fingerprint image for fingerprint characteristics and determining one or more fingerprint detection scores based on the analyzing. Each fingerprint detection score is within a respective score range that includes a respective fingerprint validity threshold. The method includes, in response to the one or more fingerprint detection scores meeting the respective fingerprint validity threshold by greater than a respective particular range of the fingerprint validity threshold, providing a positive authentication indication. Respective sensor data is obtained from each of a plurality of additional sensors of the device, including at least one of: an inertial measurement unit (IMU), an accelerometer, a gyroscope, an ambient light sensor, a proximity sensor, face detection sensor, a touchscreen, and combinations thereof. The method includes, in response to at least one of the one or more fingerprint detection scores meeting the respective fingerprint validity threshold within the respective particular range of the fingerprint validity threshold: analyzing the respective sensor data of each additional sensor to determine a respective context score for the additional sensor; determining whether each of the respective context scores meets a respective context validity threshold associated with a type of the respective sensor data; in response to determining that the respective context scores meet the respective context validity thresholds, providing the positive authentication indication; and in response to determining that at least one context score does not meet the respective context validity threshold, providing a negative authentication indication.

Various implementations of the device are described. For example, in some implementations, obtaining the respective sensor data from each of the plurality of additional sensors is performed in response to the at least one fingerprint detection score meeting the respective fingerprint validity threshold within the respective particular range of the fingerprint validity threshold. In some implementations, analyzing the fingerprint image for fingerprint characteristics includes analyzing the fingerprint image for spoof characteristics using a spoof detection technique, and wherein the one or more fingerprint detection scores includes a spoof score from the spoof detection technique. In some implementations, analyzing the fingerprint image for fingerprint characteristics includes comparing the fingerprint image to one or more profile images of the user using a matching fingerprint technique, wherein the one or more fingerprint detection scores includes a match score from the matching fingerprint technique.

In some implementations, at least one of the context scores is based on one or more patterns in the respective sensor data detected within a particular time period prior to a time of obtaining the fingerprint image. In some implementations, at least one of the additional sensors is the IMU, the accelerometer, or the gyroscope, and one of the context scores is based on motion of the device in a motion pattern indicating that the motion is caused by the user. In some implementations, the motion pattern indicates that the motion is caused by the user is based on historical sensor data indicating past motions of the device detected by the IMU, the accelerometer, or the gyroscope. In some implementations, one of the additional sensors is the ambient light sensor, and a second one of the context scores is based on illumination detected by the ambient light sensor in an illumination pattern indicating use of the device. In some implementations, the illumination pattern indicates use of the device by the user is based on historical sensor data indicating past illumination detected by the ambient light sensor during previous use of the device by the user. In some implementations, one of the additional sensors is the touchscreen, and one of the context scores is based on one or more touch gestures detected on the touchscreen within a particular time period prior to a time of obtaining the fingerprint image. In some implementations, one of the additional sensors is the proximity sensor, and one of the context scores is based on whether a proximity detection was detected within a particular time period prior to a time of obtaining the fingerprint image.

In some implementations, the method further includes detecting sensor data from another additional sensor of the device if the context scores are within a low confidence range of the respective context validity thresholds. In some implementations, analyzing the respective sensor data of each additional sensor and determining whether each of the respective context scores meets a respective context validity threshold are performed if the at least one fingerprint detection score is within the respective particular range of the fingerprint validity threshold, and/or at least one failed user attempt to be authenticated by the device is detected within a particular time period prior to a time of obtaining the fingerprint image. In some implementations, analyzing the respective sensor data of each additional sensor and determining whether each of the respective context scores meets a respective context validity threshold are performed if the fingerprint detection score is within the respective particular range of the fingerprint validity threshold, and/or one or more of the fingerprint detection scores are lower than one or more previous fingerprint detection scores determined for previous fingerprint images captured by the fingerprint sensor. In some implementations, the context validity thresholds are adjustable and are based on at least one of: a number of user attempts to be authenticated by the device within a particular time period prior to a time a time of obtaining the fingerprint image; a number of unlocks of the device within a particular time period prior to a time of obtaining the fingerprint image; and combinations thereof.

In some implementations, a mobile device includes at least one processor; a fingerprint sensor coupled to the at least one processor, the fingerprint sensor configured to provide sensor data to the at least one processor; and a plurality of additional sensors coupled to the at least one processor, the one or more additional sensors configured to provide sensor data to the at least one processor, wherein the additional sensors include at least one of: an inertial measurement unit (IMU), an accelerometer, a gyroscope, an ambient light sensor, a proximity sensor, face detection sensor, a touchscreen, and combinations thereof. The processor is configured to perform operations including operations similar to the method described above.

Some implementations provide a non-transitory computer-readable medium with instructions stored thereon that, when executed by a processor, cause the processor to perform operations that may be similar to one or more features described above for the method and/or device.

DETAILED DESCRIPTION

Figure 1A:
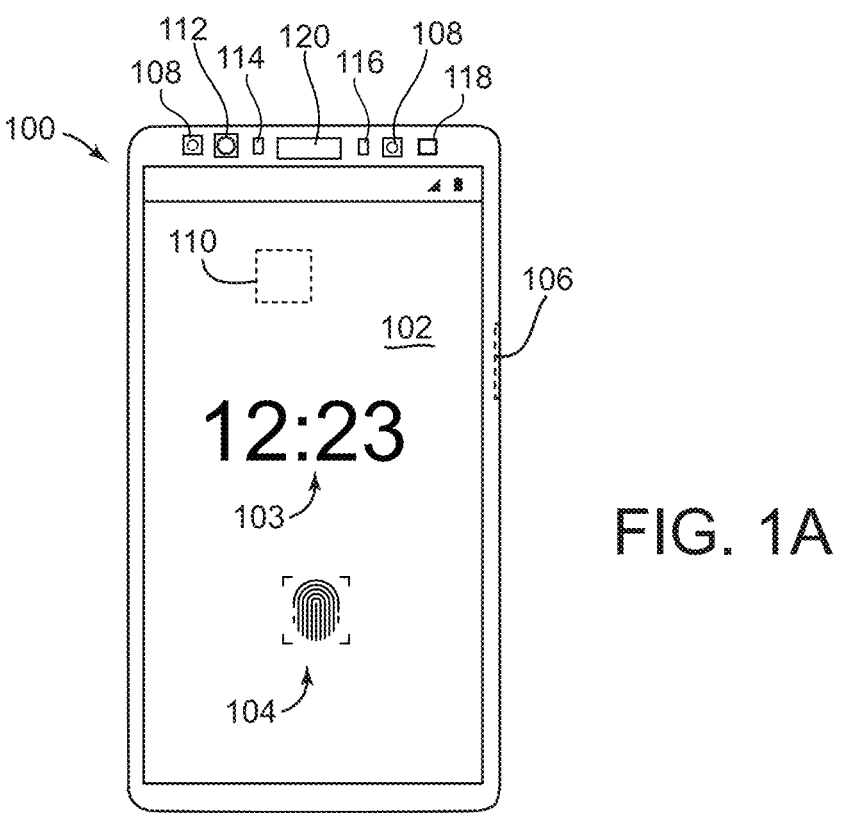
FIGS. 1A and 1B each show a view of an example mobile device which may be used for one or more implementations described herein.

This disclosure relates to user authentication and spoof detection for a device using a fingerprint sensor and additional device sensors. In some implementations, with user permission, a fingerprint image from a user is obtained from a fingerprint sensor of a device, and sensor data is obtained from multiple additional sensors of the device. Such additional sensors can include, for example, an inertial measurement unit (IMU), an ambient light sensor, a proximity sensor, a touchscreen, a face detection sensor, an image camera, etc. The fingerprint image is analyzed and one or more fingerprint detection scores are determined. If the scores meet fingerprint validity thresholds but at least one is sufficiently low to be within a particular range of its validity threshold, then the sensor data from the additional sensors is analyzed to provide respective context scores. If the context scores meet context validity thresholds, the fingerprint image is accepted as authentic, and is otherwise rejected as inauthentic (e.g., a spoof). Thus, sensor data from the additional sensors provides further verification for authentication of the user in cases where authentication is less confident. In some implementations, with appropriate user consent, the context scores for the sensor data can be analyzed for patterns that indicate a presence or use of the device by a user, e.g., before and/or during presentation of the fingerprint, to indicate that the requesting user is a person and not a spoof.

Described features advantageously provide techniques that improve the reliability of authenticating a user via a fingerprint sensor. Some previous fingerprint detection systems were vulnerable to attacks such as particular kinds of instruments used for spoofs. The use of sensor data from additional sensors is used to provide additional confidence that the fingerprint is provided on a real, live finger of a user and not a spoof instrument. In some examples, if an attacker (or testing procedure) uses robotic set ups to test spoofs, such a setup can be identified through described techniques. Spoofing can be detected by described techniques even if an attacker tries variations such as placing a transparent layer over a fingerprint sensor, moving an x- or y-position of the finger on a fingerprint sensor, altering pressure of the finger touch to the fingerprint sensor (or to the corresponding portion of a touchscreen), or rotating a spoof instrument; such attempts do not affect the other device sensors used in described techniques to verify authentication. Thus, additional protection from spoofs and other attacks is achieved by techniques described herein using existing sensors of devices. Furthermore, some implementations can reduce device power consumption when operating additional sensors for the fingerprint authentication process by powering and operating one or more additional sensors only under certain conditions and not under other conditions, e.g., operating additional sensors when fingerprint detection scores from the fingerprint sensor indicate a less confident assessment that the user's fingerprint is authentic. In some implementations, a subset of additional sensors can be operated, thus reducing device power consumption, unless the subset provides a low confidence result, in which case further additional sensors can be operated and their sensor data used in the authentication process.

FIG. 1A illustrates a view of a device 100 that can be used with spoof detection features described herein, according to some implementations. Device 100 can be, for example, a mobile device such as a cell phone, smartphone, tablet, wearable device (e.g., display glasses or goggles, wristwatch, headset, wristband, armband, jewelry, etc.), personal digital assistant (PDA), media player, portable game device, device embedded in a vehicle, etc. In some implementations, device 100 can be held (or worn) and carried by the user and operated in any location.

Device 100 includes a touchscreen 102 that displays various information and can receive input from the user via touch, e.g., gestures such as taps, swipes, etc. on the surface of the touchscreen by one or more fingers. Touchscreen 102 can be implemented as any of a variety of types of touchscreens (e.g., capacitive sensing of touch, pressure sensing of touch, etc.). Device 100 is shown displaying a lock screen user interface on touchscreen 102. For example, a current time 103 can be displayed by the lock screen. The lock screen is presented prior to allowing user access to the functions of the device and blocks the user from accessing one or more device functions until the user is authorized.

During the display of the lock screen, the user can provide authentication input to an authentication system of the device. The user can be authorized to access device functions if the authentication input is accepted as authentic, at which point the lock screen can be removed and the regular interface of the device 100 is displayed, which allows the user to access device functions. Such device functions can include, for example, use of application programs, display of information, sending and receiving information in communication with other devices over communications networks (e.g., wireless networks), receiving user input and/or providing output on the device from applications executing on the device, etc. If the authentication input is rejected as not being authentic, the user is not authorized and is not allowed access to device functions. For example, lock screen may continue to be displayed, the display is turned off, etc. In various implementations, the lock screen can remain displayed on touchscreen 102 after authorizing the user and can be removed after receiving a user touch gesture such as a swipe (e.g., to display the last screen the user was using), or the lock screen can be removed immediately upon user authorization.

Device 100 can implement one or more authentication techniques that can receive user input to evaluate to determine whether to authenticate the user as an authorized user and allow the user to access device functions, or to reject the user as an unauthorized user and deny access of the user to device functions.

Authentication systems on device 100 include a fingerprint sensor. In this example, the fingerprint sensor is positioned in touchscreen 102, e.g., under display screen glass and/or under display layers of the touchscreen 102. The sensing field of the fingerprint sensor can correspond to displayed icon 104 on touchscreen 102 to indicate a location for the user to place a finger for fingerprint scan. In various implementations, fingerprint sensors can be provided in other areas of the device, including on the side of the device, e.g., as fingerprint sensor 106, on the back of the device (not shown), on a physical button of the device (not shown), on a front bezel of the device (not shown), etc. In some implementations, the entire display area of the touchscreen may be capable of fingerprint sensing. In such implementations, no specific icon may be displayed since the entire touchscreen is capable of fingerprint sensing. The fingerprint sensor can use any type of sensor, e.g., optical, infrared, capacitive, ultrasonic, etc.

A user places their finger on the sensing area of the fingerprint sensor indicated by icon 104, and the fingerprint sensor captures a fingerprint image of the fingerprint of the placed finger. For example, an optical fingerprint sensor can detect light reflected by a finger, e.g., light provided by display screen 102 or other light source, to capture an image of the fingerprint of the finger, or other components and techniques can be used.

To authenticate the user via the fingerprint sensor, one or more fingerprint detection techniques can be performed based on the captured fingerprint image. For example, a match technique can perform a match test, in which the captured image is compared to one or more stored fingerprint profile images that were previously captured from the finger of an authorized user. Such a test can provide a match score that indicates how closely the captured fingerprint image matches a stored fingerprint profile image. In some implementations, the match test is satisfied if a determined match score meets a validity threshold.

In some implementations, a spoof detection test technique can perform a spoof test based on the fingerprint image. This test attempts to determine whether the fingerprint sensor captured an image of a spoof of the authorized user's fingerprint, e.g., an attack instrument that is made to look like the authorized user's fingerprint. In such a test, particular characteristics of the captured fingerprint image are analyzed and compared to reference characteristics in a fingerprint image of a fingerprint of a real, live finger. In some implementations, the spoof detection test can provide a spoof score that indicates how closely the captured fingerprint image resembles a spoof. If the spoof score indicates that the fingerprint image does not have sufficient match with the characteristics of a real fingerprint (and thus could be a spoof), the fingerprint image is rejected.

In some implementations, authentication systems on device 100 can include a face detection sensor 108. In this example, face detection sensor 108 is positioned at the top area of the device. For example, face detection sensor 108 can include two components including a dot projector that projects infrared light dots onto a user's face, and an infrared face detection camera that reads the pattern of dots. Other types of face detection sensors can alternatively be used based on a variety of types of technologies and positioned in different locations of the device 100. A user may orient their face and the device 100 to place their face in the detection region of the face detection sensor, and the face detection sensor captures one or more images of the user's face. To authenticate the user via the face detection sensor, the captured image can be compared to one or more stored face profile images that were previously captured from an authorized user to determine if the captured image matches the profile images.

Device 100 may include any of multiple other sensors that capture sensor data detected by the other sensors. The captured sensor data can be used for a variety of functions. In implementations described herein, the sensor data from one or more of these sensors (and/or from face detection sensor 108) is used to assist in the authentication of a fingerprint image.

Such other sensors can include an inertial measurement unit (IMU) 110 that can include one or more of accelerometer(s), gyroscope(s), and/or magnetometer(s), and which can measure acceleration, angular rate, orientation, gravitational forces, etc. and thus can sense motion of the device 100, e.g., when it is picked up by a person, taken out of a pocket, carried while a person is moving (e.g., walking or riding in a vehicle), etc.

Other sensors also may include a front camera 112, which can capture images of scenes in its field of view, e.g., a user facing the device 100. The sensors also may include an ambient light sensor 114, which includes a photodetector that senses the amount of ambient light present around the device 100, and can be used to adjust display brightness of the touchscreen 102. The sensors also may include a proximity sensor 116, which can include an optical emitter and detector that transmits electromagnetic energy (e.g., infrared light) and senses its reflection to determine the distance to an object such as the head of a user when holding the device close to their head (e.g., when making a call with the device), and/or can sense objects that indicate the orientation of the device. In some implementations, the sensors can include a radar sensor 118 that can detect motion in the sensor's sensing field (hand gestures, head or face motion, etc.).

In various implementations, the various sensors and other components described above can be positioned in locations of device 100 other than those shown in FIG. 1.

Device 100 may include a speaker 120 that outputs sound waves as audio. One or more other input and output devices can also be provided on device 100, e.g., additional audio speakers, microphones, physical buttons, trackpads, etc. Device 100 can communicate wirelessly with one or more other devices, base stations, etc. using components such as a radio, antennas, etc.

Figure 1B:
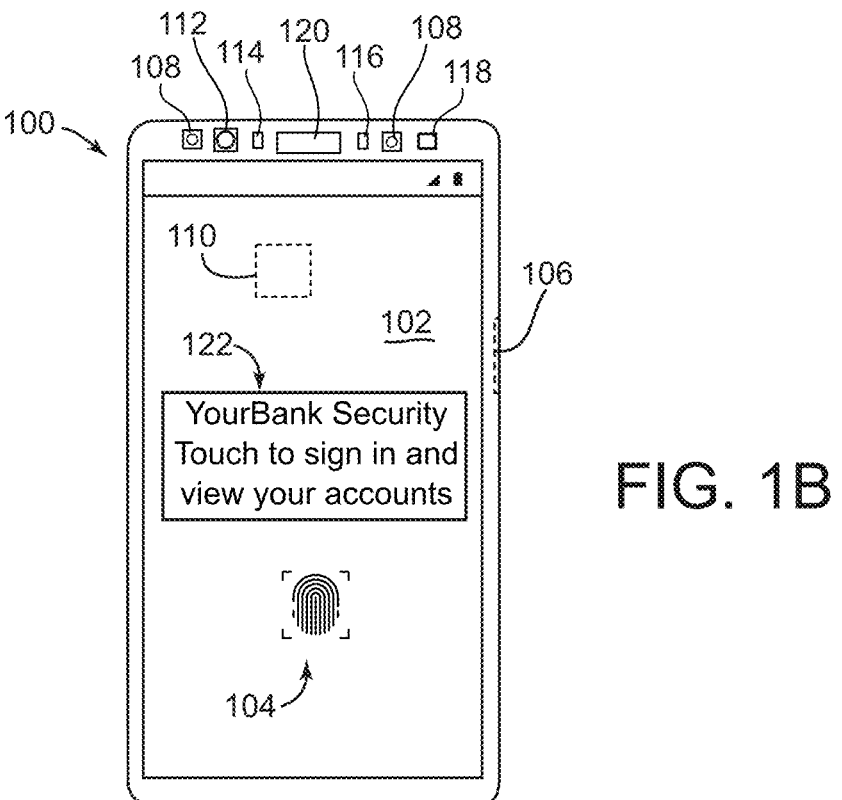

FIG. 1B illustrates a view of device 100 of FIG. 1A, in which a different user interface is displayed on touchscreen 102. In FIG. 1B, the user is operating device 100 and has provided user input to launch a financial application or a login to a financial website or other service, which requires authorization of the user. For example, the user may have provided input to log into a bank application that provides financial information of accounts owned by the user. A prompt 122 can be displayed on touchscreen 102, along with icon 104 that corresponds with the fingerprint sensor similarly as described above. The user can place their finger on icon 104 to enable the fingerprint sensor to capture an image of the fingerprint of the finger and to check the identity of the user for authorization, similarly to the lock screen example of FIG. 1A.

Figure 2:
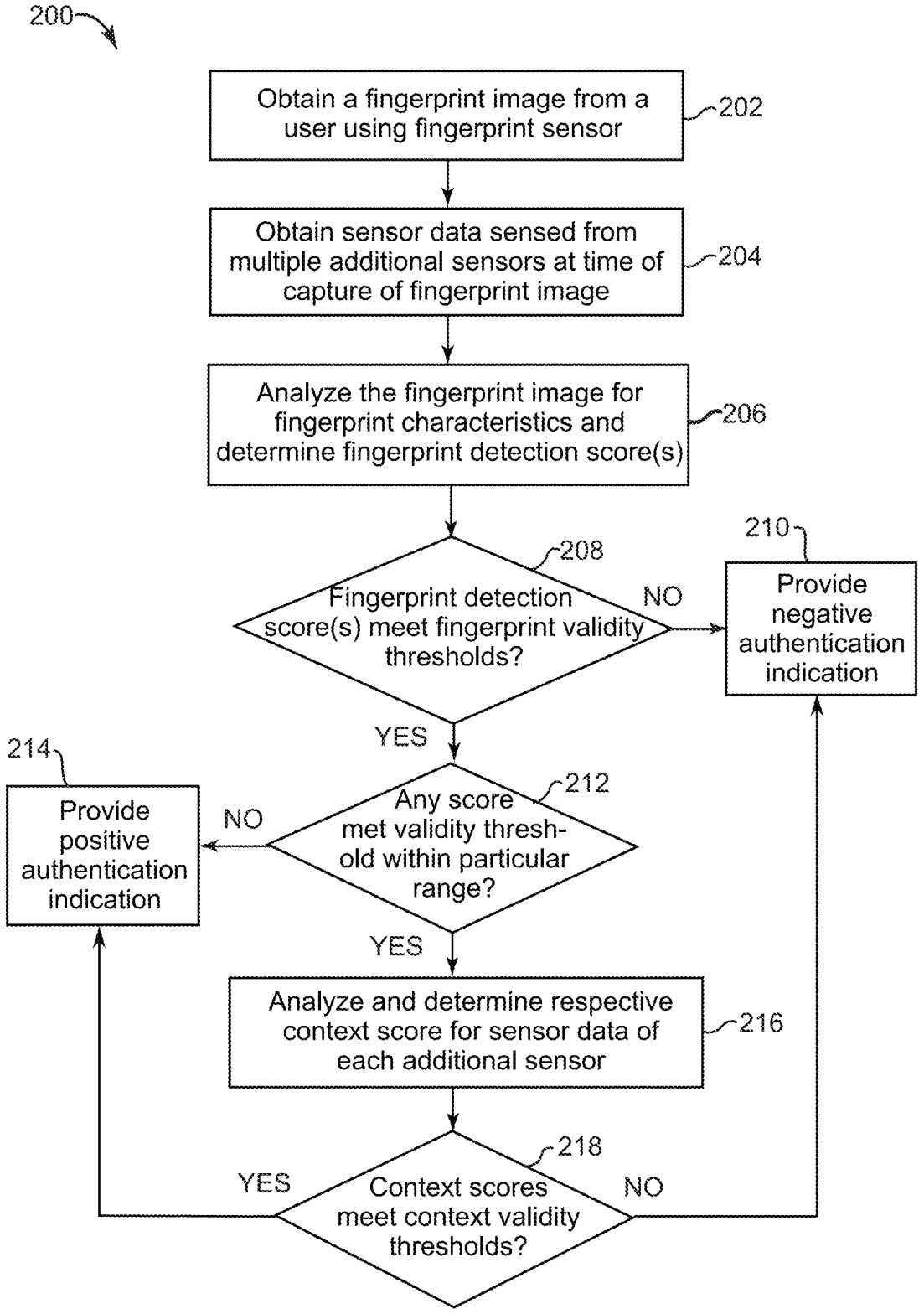
FIG. 2 is a flow diagram illustrating an example method to authenticate user access and detect spoofs for a device using a fingerprint sensor and additional device sensors, according to some implementations.

FIG. 2 is a flow diagram illustrating an example method 200 to authenticate user access and detect spoofs for a device using a fingerprint sensor and additional device sensors, according to some implementations. In some implementations, method 200 can be implemented, for example, by a device such as a mobile device, e.g., device 100 as shown in FIG. 1. In described examples, the implementing device includes one or more digital processors or processing circuitry ("processors"), and can include one or more storage devices (e.g., memory or other storage), examples of which are described below.

Implementations discussed herein do not require collection or usage of user personal information. For example, fingerprint images and other sensor data captured on a client device can be processed by method 200 at the client device without collection or usage or storage of user personal information, and without transmission of images or other user data to server systems. In situations in which certain implementations discussed herein may collect or use personal information about users, users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. Each user for which personal information is to be collected is presented with one or more options to allow control over the information collection relevant to that user, to provide permission or authorization as to whether the information is collected and as to which portions of the information are to be collected. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Biometric information, such as fingerprint data, if collected is stored securely on-device (e.g., in a secure storage area separate from main storage of the device; with encryption; etc.) and is not transmitted to any other device. Further, a fingerprint registration (enrollment) process may be offered to the user to register one or more fingerprints for authenticating to the device. When a fingerprint is registered, a fingerprint representation (e.g., value of a mathematical function computed based on the fingerprint) may be stored securely, instead of the raw fingerprint. The fingerprint representation may be used for subsequent matching for authentication. Fingerprint or other biometric data is sensed with specific user permission (e.g., the user is provided a user interface explaining how biometric data is used for authentication and providing options for alternate ways of authentication) and is processed for the specific purpose of authentication. Fingerprint and other biometric data is not used if the user device is registered in a location that has regulations that prevent the collection and/or use of such data. The user is provided with options to delete the stored fingerprint data (e.g., mathematical value), to register additional fingerprints, to switch to other authentication mechanisms, etc.

Method 200 may begin at block 202. In block 202, a fingerprint image is obtained by a device from a user using a fingerprint sensor of (or in communication with) the device. For example, a user may have placed their finger on a fingerprint sensor of the device, such as the fingerprint sensor at icon 104, or fingerprint sensor 106, of device 100, and the fingerprint sensor captures the fingerprint image of the fingerprint of the placed finger. Block 202 may be followed by block 204.

In block 204, sensor data is obtained from each of multiple additional sensors of the device, if user consent has been received by the device to allow the obtaining of the sensor data. For example, a respective set of sensor data can be obtained from each additional sensor. In some examples, first sensor data is obtained from a first additional sensor and second sensor data is obtained from a second additional sensor, etc. Each additional sensor can be any sensor of the device that can provide sensor data, e.g., indicating presence of a user relative to the device, and which is not a fingerprint sensor. For example, any of the sensors described for device 100 of FIG. 1 can be used, including a face detection sensor (e.g., face detection sensor 108), a touchscreen (e.g., touchscreen 102), an IMU (e.g., IMU 110), an accelerometer, a gyroscope, a magnetometer, a front camera (e.g., front camera 112), an ambient light sensor (e.g., ambient light sensor 114), a proximity sensor (e.g., proximity sensor 116), a radar sensor (e.g., radar sensor 118), etc.

At least some of the sensor data may include an indication of the surrounding physical environment of the device, e.g., within a sensing field of the sensor that provides the sensor data. The respective sensor data can be captured by each additional sensor at the time that the fingerprint image is captured by the fingerprint sensor. In some implementations, the sensor data can also include sensor data captured during a time period before the capture of the fingerprint image, and/or a time period after the capture of the fingerprint image. The time period can be of a predetermined duration, and/or can be of dynamic duration, e.g., based on one or more events detected by the device. For example, the additional sensor data can be captured starting at a time when a lock screen and a prompt to read a user fingerprint is initially displayed by the device, and the sensor data is captured during the time period when that lock screen is displayed until the fingerprint image is captured (and/or for a timer period after the capture).

In further examples, the sensor data can be captured after a user is authorized (e.g., via fingerprint sensor) and the user successfully gains access to functions of the device, and during a time period including a time when the user attempts to access a function that requires additional authorization (e.g., a financial operation) and another fingerprint image is captured. In further examples, the sensor data can be captured starting after a fingerprint image is rejected from being authorized, until another fingerprint image is captured when the user tries again to be authorized by the device. In further examples, the sensor data can be captured whenever the device is activated or wakened by user interaction with the device, e.g., when the device is picked up from a surface (e.g., IMU sensors are active and reading sensor data to detect device motion that indicates the device is picked up), and/or for a particular time period after a last user presence was detected.

Each additional sensor is a different type of sensor than the other additional sensors. For example, if a first additional sensor is an IMU, a second additional sensor can be an ambient light sensor (or any of the other described types), a third additional sensor can be a proximity sensor, etc.

In some implementations, obtaining the sensor data in block 204 can be performed at a later time in method 200, and may not be performed in some cases. For example, block 204 can be performed at the positive result of block 212 (described below), e.g., if one or more fingerprint detection scores are less confident by being within the particular range of the respective fingerprint validity thresholds. In such cases, power expenditure can be reduced since the additional sensors may be powered only under certain conditions and may not be powered for the fingerprint authentication method 200 under other conditions, e.g., a negative result of block 208 or block 212.

In some implementations, only some (e.g., a first subset) of the available additional sensors are powered to provide obtained sensor data in block 204, e.g., thus reducing power consumption of the device for the fingerprint authentication method 200 compared to powering all device sensors. In some implementations, a larger number (e.g., a second larger subset) of the additional sensors can be powered to provide more sensor data if the sensor data from the first set of additional sensors does not provide a sufficiently confident verification of an authentic fingerprint (e.g., the context scores from the first set of sensor data are within a threshold amount of respective context validity thresholds—above or below the thresholds—as described below with reference to blocks 216 and 218).

The fingerprint images from block 202 and the sensor data from block 204 are captured, provided, and available within a Trusted Execution Environment (TEE) of the device. The fingerprint data and sensor data from the other sensors is encrypted within the TEE. This environment protects and secures this data from outside access, e.g., on a secure bus connected to the fingerprint sensor and other sensors. Block 204 may be followed by block 206.

In block 206, the fingerprint image is analyzed for fingerprint characteristics and one or more finger detection scores are determined. Each fingerprint detection score is within a respective score range that includes a respective fingerprint validity threshold (see block 208). In some implementations, standard fingerprint detection techniques can be used to analyze the fingerprint image to provide one or more fingerprint detection scores. For example, in some implementations, a fingerprint technique includes a matching fingerprint technique that includes a match test, which compares the captured fingerprint image and one or more stored fingerprint profile images that are associated with an authorized user, e.g., previously captured from the finger(s) of the authorized user, such as during a fingerprint registration process. For example, the captured fingerprint image can be rotated and orientated to match orientation of one or more profile images and then compared. Such a test can provide a match score that indicates how closely a captured fingerprint image matches a stored fingerprint profile image. While the foregoing description refers to a "stored fingerprint profile image", the match score may be based on a mathematical distance between a stored mathematical value (computed from the fingerprint image presented during a fingerprint enrollment process) and a computed mathematical value based on the captured fingerprint image. The use of mathematical distance may enable authentication to be performed without an actual stored fingerprint profile image. Thus, the match test verifies whether the fingerprint image depicts the fingerprint of a particular authorized user of the device (whose actual identity may not be indicated by the profile).

In some implementations, a fingerprint detection technique includes a spoof detection technique that includes a spoof detection test based on the captured fingerprint image. This technique attempts to determine whether the fingerprint image depicts a real, live finger or a spoof of the authorized user's fingerprint, e.g., an attack instrument that is made to look like the authorized user's fingerprint, such as a 2D or 3D object depicting a fingerprint. In this test, particular characteristics of the captured fingerprint images can be analyzed and compared to expected reference characteristics in a fingerprint image of a real fingerprint of a live finger. For example, the lighting, blurriness, shapes of ridges and valleys of the fingerprint, and other characteristics can be compared to reference characteristics of real fingerprints in fingerprint images. For example, the spoof detection test can be a presentation attack detection (PAD) test. In some implementations, the spoof detection test can provide a spoof score that indicates how closely the captured fingerprint image resembles a spoof (or how closely the fingerprint image resembles a real fingerprint). Other finger detection tests can additionally or alternatively be used in block 206 and can provide corresponding scores similarly. Block 206 may be followed by block 208.

In block 208, it is determined whether the fingerprint detection score(s) determined in the test(s) of block 206 meet fingerprint validity thresholds in the score range of each test. A respective fingerprint validity threshold is used to qualify the fingerprint image under each of the tests performed in block 206. For example, for the match test, if the match score meets (e.g., is above) the match validity threshold, this indicates that the match between the capture fingerprint image is the same or sufficiently close to one or more profile images for the match test to be satisfied. In another example, if the spoof score does not meet (e.g., is below) a spoof validity threshold, this indicates that the fingerprint image does not have sufficiently similar characteristics to an image of a real fingerprint (and thus could be a spoof) and the spoof detection test is not satisfied. Block 208 may be followed by block 210.

If one or more of the tested fingerprint validity thresholds are not met as determined in block 208, the method continues to block 210, in which a negative authentication indication is provided, e.g., indicating that the captured fingerprint image is rejected. In some implementations, if any of multiple tests performed in block 206 does not meet its respective fingerprint validity threshold, then the negative authentication indication is provided in block 210. This rejection indicates that the fingerprint image may not match fingerprint profile image(s) to which it was compared, or that the fingerprint image was detected to have one or more characteristics that were similar to a spoof instrument or that were otherwise not sufficiently similar to a real fingerprint. In some implementations, the negative authentication indication causes the device to deny the user access to the device or application which they are trying to access. In some implementations, the method can return to block 202 to obtain another fingerprint image if the user re-places or continues to place a finger on the fingerprint sensor.

In some implementations, with user permission, occurrence(s) of failing to meet fingerprint validity threshold(s) in block 208 and of the negative indication in block 210 can be logged in device storage. This data can be used in the evaluation of other fingerprint images in later performances of method 200 by the device (e.g., to adjust one or more verification thresholds described below). In some implementations, if user consent has been obtained, data related to the analysis of block 206 can also be stored and used in later evaluations of fingerprint images. Such data can include, for example, the fingerprint detection scores (e.g., match score and/or spoof score), the time of the fingerprint sensing and evaluation, the location of the device at the time of fingerprint sensing, etc.

If the fingerprint validity threshold(s) are met as determined in block 208, the method continues to block 212, in which it is determined whether any (e.g., at least one) of the fingerprint detection scores determined in block 206 have met their respective fingerprint validity threshold and are within a respective particular range of the respective fingerprint validity threshold for that score (e.g., are less than a respective particular range threshold associated with that score). The particular range may be different for each fingerprint detection test and, in some implementations, can be a small range relative to the entire possible score range (e.g., 10% of the score range, or other amount). In these implementations, if a score is within the particular range of the validity threshold, the score is close to the validity threshold and thus there is lower confidence in the authenticity of the finger image than if the score were greater than the particular range from the validity threshold that indicates a greater confidence that the fingerprint image is authentic (e.g., belongs to the authorized user and/or is not a spoof). A fingerprint detection score within the particular range thus indicates that the score is close to indicating a failure of the fingerprint image to qualify under the associated fingerprint detection test. Such a score can be used to determine that additional sensors can be used to assist and verify fingerprint detection.

If all the fingerprint detection scores are determined to have met their respective fingerprint validity thresholds by greater than the particular range (e.g., the fingerprint detection scores are greater than their respective particular range thresholds), then the fingerprint is considered to be authentic and/or that the captured fingerprint image is not of a spoof, and a negative result from block 212 causes the method to continues to block 214, described below.

If any fingerprint detection score is determined to have met its fingerprint validity threshold within the particular range in block 212 (e.g., at least one fingerprint detection score is less than its respective particular range threshold), then the score indicates a lower confidence in an authentication or spoof detection of the fingerprint image, and a device context evaluation is performed based on multiple sets of sensor data from multiple additional sensors of the device. The method continues to block 216.

In some implementations, block 212 can check for one or more different conditions, e.g., in addition to or instead of determining whether fingerprint detection scores are within the respective particular ranges as described above. In some implementations, if all of the examined condition(s) are determined to be met in block 212, a positive result of block 212 is provided and the method continues to block 216. In some implementations, if any one of multiple examined conditions are determined to be met in block 212, a positive result of block 212 is provided and the method continues to block 216. For example, an example different condition can include at least one failed user attempt to be authenticated by the device (e.g., by fingerprint sensor or other authentication such as face detection sensing) detected within a particular time period prior to a current time of obtaining the fingerprint image in block 202. If such an attempt has been made, the method can perform the context evaluation of blocks 216 and 218 (in some implementations, the method continues to block 216 if other required condition(s), if any, also are met). The detection of the one or more such failed user authorization attempts can also cause a change of one or more context validity thresholds, e.g., make such thresholds stricter.

In another example, a different condition can include determining whether each fingerprint detection score is closer to its respective fingerprint validity threshold (e.g., a score, such as a lower score, that meets the threshold less strongly) than one or more (e.g., multiple) corresponding previous fingerprint detection scores determined for previous fingerprint images captured by the fingerprint sensor. For example, this may indicate that the current fingerprint image is more suspicious since previous captured fingerprint images had higher fingerprint detection scores (of the same corresponding type, e.g., match score, spoof score, etc.) that were greater than their fingerprint validity thresholds by a larger amount and qualified as authentic fingerprints more strongly. Thus the method can perform the context evaluation of blocks 216 and 218 to provide more confidence to the fingerprint authentication process.

In block 214, a positive authentication indication is provided, e.g., indicating that the fingerprint image is accepted. In some implementations, the positive authentication indication causes the device to grant the user access to the device or application which they are trying to access. Thus, the fingerprint image can be considered to depict a real fingerprint and the fingerprint sensor can be considered to have sensed a finger of an authenticated user to be allowed access to device functions. This acceptance indicates that the fingerprint image matches fingerprint profile image(s) to which it was compared, and that the fingerprint image was detected to have one or more characteristics similar to a real fingerprint and/or not sufficiently similar to a spoof instrument. In some implementations, the method can return to block 202 to obtain another fingerprint image if the user re-places or continues to place a finger on the fingerprint sensor.

In some implementations, with user permission, occurrence(s) of meeting fingerprint validity threshold(s) in block 208 and the occurrence of the positive authentication indication in block 214 can be logged in device storage, and this data can be used in the evaluation of other fingerprint images in later performances of method 200 by the device (e.g., to adjust one or more verification thresholds described below). In some implementations, if user consent has been obtained, data related to the analysis of block 206 can also be stored and used in later evaluations of fingerprint images, similarly as described above.

In block 216, the respective sensor data of each additional sensor that was obtained in block 204 is analyzed and a respective context score is determined for the sensor data of each additional sensor. For example, the sensor data of each additional sensor as obtained in block 204 is analyzed or tested to obtain a respective context score for that additional sensor. The test of the sensor data can take a variety of forms, and each test may depend on the particular type of sensor data being tested.

In some implementations, each context score can be based on the extent to which the sensor data indicates a presence, e.g., a proximity, of a real user to the device, e.g., instead of a mechanical device like a spoof instrument. For example, a higher context score can be provided for sensor data that indicates detection of a person in the sensor's sensing field (e.g., next to the device), and a lower context score can be provided for sensor data that indicates lack of detection of a person. For example, motion of the device when being carried, a user touch gesture on a touchscreen, blocking of illumination, proximity of an object, detection of a face, etc., by an additional sensor can indicate a user presence. In some implementations, the sensor data can be compared to corresponding stored context data that is known to indicate a particular context such as user presence, and the context score is determined based on how similar the sensor data is to the stored context data.

In some examples, if the additional sensor is an IMU, the sensor data for that sensor can indicate motion of the device. In some implementations, particular motion of the device can indicate a user presence, e.g., indicate that the device is being held by a user when the fingerprint image is being captured from a user's finger. In some implementations, any motion of the device can qualify as indicating user presence (e.g., a binary context score of 0 or 1, present or not present). In some implementations, the motion of the device can be compared to stored data profiles of device motion sensor data that indicate common motion patterns of devices by general users (e.g., pulling the device from a pocket, picking up the device and/or holding it, etc.), and a context score determined based on how similar the motion pattern indicated in the sensor data is to the motion pattern indicated in any of the stored data profiles.

In some implementations, the context score for any of the types of sensor data can be based on sensor data that describes user presence over a time duration including a time period before and/or after the capture of the fingerprint image in block 202. For example, at least one of the context scores can be based on one or more patterns in the sensor data detected within a particular time period prior to a time of obtaining the fingerprint image, and/or within a time period after the time of obtaining the fingerprint image. For example, if the additional sensor is an IMU, sensor data can be examined that describes motion of the device over a time period before the fingerprint image was captured, and the context score is based on that sensor data (e.g., based on a comparison to general patterns of that type of sensor data). For example, motion data can be continually captured by the IMU, e.g., when the device was picked up by the user (or removed from a pocket, etc.) and while the user presents a finger to the fingerprint sensor, and this motion data can be examined to determine a context score. In some implementations, the sensor data obtained by the additional sensors over a predetermined or particular time period, e.g., the last 30 seconds, can be used. In some implementations, the time period over which sensor data is analyzed can be reset and restarted (e.g., such that the previously captured sensor data is discarded). In some implementations, the reset can be based on an event occurring on the device (e.g., the user being authorized and gaining access, the device being sensed by the IMU as motionless for a threshold period of time, no user presence detected via one or more sensors for a threshold period of time, etc.). In some implementations, a magnitude of the context score can be based on how recent to the current time that particular patterns (e.g., indicating the device is held or picked up) have occurred; e.g., more recent activity can provide a higher context score than older activity.

In some implementations, if user consent has been obtained, a history of sensor data can be stored by the device that has been sensed during previous interactions with the device by the authorized user of the device, and this history of sensor data can be used as one or more of the stored sensor data profiles (e.g., a pattern of motion) to which the current sensor data can be compared to determine a context score. In some implementations, the closer a match of the sensor data (or patterns in the sensor data) to the history of sensor data (e.g., patterns in the history of sensor data), the higher is the context score. In some implementations, matches of the sensor data to these user-specific stored data profiles based on the history of the authorized user can provide a higher context score than matches to general data profiles of illumination data based on general users.

For example, if the history of IMU sensor data (obtained with user consent) indicates that the authorized user often accesses the device and places a finger on the fingerprint sensor while the device is laying on a horizontal surface (e.g., at particular times of day), a similar pattern of motion indicated in IMU sensor data obtained in block 204 can be provided a high context score. In contrast, a different user may have a different common historical pattern of movement of the device (as sensed by the IMU with user consent) when inputting fingerprints, e.g., by holding or carrying the device, such that a pattern of motion that indicates the device was flat would provide a lower context score for that user.

In further examples of other types of sensors, if the additional sensor is an ambient light sensor, the sensor data for that sensor can indicate illumination near the device, and the context score is based on that sensor data. For example, such illumination can indicate presence of a person if the detected illumination reduces (e.g., the user blocking some ambient light). In some implementations, the sensor data indicates illumination over a time period that includes the time when the fingerprint image was captured. For example, the illumination sensor data can be continually captured by the ambient light sensor, e.g., when the device was picked up by the user (or removed from a pocket, etc.) and while the user presents a finger to the fingerprint sensor, and this illumination data can be examined to determine a context score. Similarly to the IM sensor data described above, the illumination sensor data can be captured over a time period before and/or after the fingerprint image is captured in block 202. In some implementations, the illumination sensor data (e.g., illumination patterns) can be compared to stored data profiles of illumination data that indicate common illumination patterns of illumination detected by ambient light sensors on devices when general users present fingerprint to fingerprint sensors, and a context score determined based on how close the detected illumination pattern is to the illumination patterns indicated in any of the stored data profiles. In some implementations, if user consent has been obtained, one or more of the data profiles can be based on a history of illumination sensor data sensed and stored during previous interactions with the device by the authorized user of the device.

In another example, if the additional sensor is a proximity sensor, the sensor data for that sensor can indicate detection of objects near the device, and the context score is based on that sensor data. In some implementations, the sensor data indicates detection of objects over a time period that includes the time when the fingerprint image was captured. For example, the proximity sensor data can be continually captured by the proximity sensor when the device was picked up by the user (or removed from a pocket, etc.) and while the user presents a finger to the fingerprint sensor, and this proximity sensor data can be examined to determine a context score. Similarly to the IM sensor data described above, the proximity sensor data can be captured over a time period before and/or after the fingerprint image is captured in block 202, and/or can be compared to stored data profiles of proximity sensor data that indicate common patterns of detected objects detected by proximity sensors on devices when general users present fingerprint to fingerprint sensors (e.g., lack of detection of an object when the device is pulled out of a pocket, within a particular time period prior to reading the fingerprint image), and a context score determined based on how close the pattern of object detection for the proximity sensor data is to patterns of object detection indicated in any of the stored data profiles. In some implementations, if user consent has been obtained, one or more of the data profiles can be based on a history of proximity sensor data sensed and stored during previous interactions with the device by the authorized user of the device.

Similarly, a respective context score can be correspondingly based on the sensor data for any of the sensors of the device, such as the face detection sensor, the touchscreen, the radar sensor, the image capture camera, and/or other types of sensors described herein. In some implementations, the sensor data for any of the sensors can be captured over a time period that includes the time when the fingerprint image was captured. In some implementations, the sensor data (e.g., patterns in the sensor data, such as touch gesture patterns for a touchscreen sensor, face/object presence patterns for the face detection sensor, radar sensor, or camera, etc.) can be compared to stored data profiles of the same type of sensor data that indicate common patterns of sensor data detected by the same types of sensors on devices when general users present fingerprint to fingerprint sensors, and a context score determined based on how close the pattern is to the patterns in any of the stored data profiles. In some implementations, if user consent has been obtained, one or more of the data profiles can be based on a history of sensor data sensed and stored during previous interactions with the device by the authorized user of the device.

In some implementations, sensor data from a different number of additional sensors of the device can be analyzed and a corresponding number of context scores determined for that sensor data, e.g., based on one or more conditions. For example, if sensor data from a subset (e.g., two) of additional sensors is analyzed and context scores determined for those sensors, and if the context scores are within a certain range (e.g., a low confidence range) of their respective context validity thresholds (as determined below in block 218), then sensor data from one or more additional sensors can be analyzed and context scores determined. In some implementations, the low confidence range can be above and/or below the context validity thresholds, e.g., the scores may meet or not meet the thresholds. The use of sensor data from more additional sensors may provide additional confidence in a device context determination, e.g., if some sensor data does not indicate a sufficiently high confidence for a valid user context to the fingerprint sensing. Block 216 may be followed by block 218.

In block 218, it is determined whether the context scores determined in block 216 meet respective context validity thresholds. Meeting such context validity thresholds can contribute to an indication that a real user has presented the fingerprint captured in the fingerprint image and it is not likely to be a spoof. Each context score is within a respective score range that includes a respective context validity threshold. Each type of sensor data can be associated with a respective context validity threshold that may be different from other context validity thresholds of other types of sensors.

For example, some context validity thresholds may be low, e.g., so that the sensor data need only be partially similar to profile data, while other context validity thresholds may be higher. Some content validity thresholds may be binary, e.g., if a motion or object was detected, then the context validity threshold is met, and if no such motion or object was detected, the content validity threshold is not met. In some implementations, block 218 can determine whether the context scores are within a low confidence threshold of the context validity thresholds, and if so, additional context scores may be determined and compared to their won context validity thresholds to provide additional confidence in the authentication process, as described above for block 216.

In some implementations, context validity thresholds for the additional sensors may be variable and dynamic, and may vary based on one or more device conditions, authentication conditions, etc. For example, a context validity threshold can be adjusted based on a number of user attempts to be authenticated by the device within a particular time period prior to a time of obtaining the fingerprint image.

In some examples, if the fingerprint image is the second, third, or later fingerprint image to be captured within a particular time period, and there were one or more failed attempts at fingerprint authentication within that time period, then one or more of the context validity thresholds (and/or the particular range of one or more of the fingerprint validity thresholds described above) can be adjusted to be more difficult to satisfy. Such greater difficulty can include, e.g., thresholds made stricter, such as requiring a closer match to profile data or pattern of sensor data, and/or examining more sensor data sensed over a longer time period to determine the context score, compared to thresholds used when the fingerprint image is from a first authentication attempt within the particular time period.

In another example, a context validity threshold can be adjusted based on a number of unlocks of the device (e.g., authentications) within a particular time period prior to the time of obtaining the fingerprint image (e.g., a higher number indicating a stricter context validity threshold, since such activity may be suspicious). In another example, a first (e.g., more strict) context validity threshold can be used when the user is to be authenticated for performing some device tasks (e.g., financial transactions) compared to a second, different context validity threshold (e.g., less strict) used for performing other device tasks (e.g., accessing the device from a lock screen).

In some implementations, an overall context score can be determined that includes multiple individual context scores, where the individual context scores are the respective context scores determined in block 216 for the additional sensors. For example, the overall context score can be a sum or other combination of individual context scores. In some implementations, respective individual context scores can be weighted differently in the determination of the overall context score, e.g., depending on how much the sensor data from each additional sensor data is considered to reliably indicate user presence or other factors indicative of authentic user input. In some implementations, the overall context score can be compared to an overall context validity threshold in block 218.

If the context scores meet the context validity thresholds as determined in block 218 (or an overall context score meets an overall context validity threshold), then the method continues to block 214, in which a positive authentication indication is provided, similarly as described above. In some implementations, all of the context scores determined in block 216 are required to meet their respective context validity thresholds to provide a positive result from block 218. In some implementations, a particular ratio or percentage of the context scores must meet their respective context validity thresholds to provide a positive result. Alternatively, an overall context score must meet an overall context validity threshold.

If the context scores do not meet the context validity thresholds as determined in block 218, then the method continues to block 210, in which a negative authorization indication is provided similarly as described above.

In some implementations, the device context evaluation of blocks 216 and 218 can be performed regardless of whether the fingerprint detection scores are within the particular range of the fingerprint validity thresholds in block 212. For example, block 212 can be omitted from method 200 and the positive result of block 208 can be followed by block 216.

In various implementations, various blocks of method 200 may be combined, split into multiple blocks, performed in parallel, or performed asynchronously. In some implementations, one or more blocks of method 200 may not be performed or may be performed in a different order than shown in FIG. 2. For example, in some implementations, block 204 may be performed at a later time, e.g., after a positive result of block 212 as described above. Method 200, or portions thereof, may be repeated any number of times using additional inputs.

Figure 3:
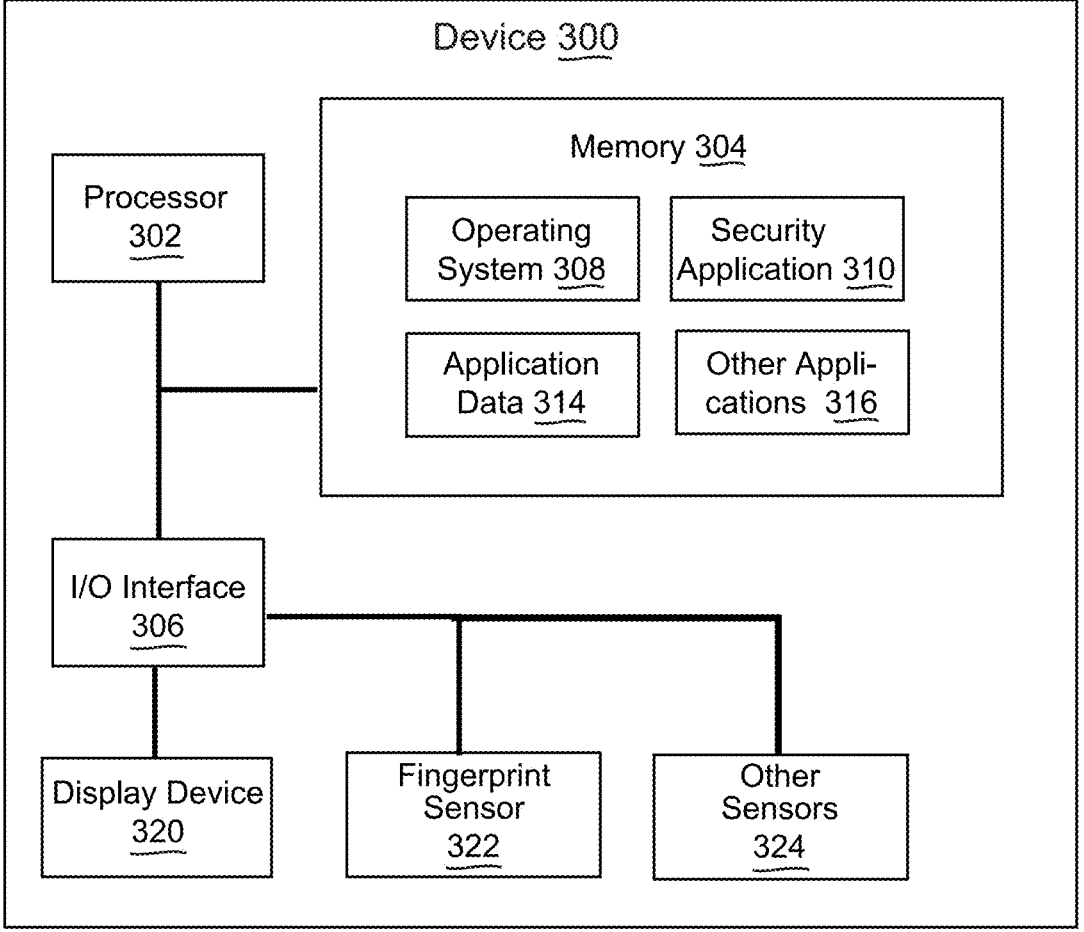
FIG. 3 is a block diagram of an example device which may be used to implement one or more features described herein.

FIG. 3 is a block diagram of an example device 300 which may be used to implement one or more features described herein. In some examples, device 300 may be used to implement a client device, e.g., a mobile device 100 shown in FIG. 1, or any mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc. Alternatively, device 300 can implement a different type of device, e.g., server device, desktop computer device, etc. that can be used with one or more implementations described herein. Device 300 can be any suitable computer system, server, or other electronic or hardware device as described above.

Features described herein can operate in several environments and platforms. In some implementations, all operations can be performed within a mobile device. In some implementations, with user consent, a client/server architecture can be used, e.g., a mobile device (as a client device) sends data to a server device (e.g., sensor data such as fingerprint image data and sensor data) and receives data from the server (e.g., fingerprint validity scores, context scores, authentication indications, etc.) to be used in operations by the client device. In another example, operations can be split between the mobile device and one or more server devices.

In some implementations, device 300 includes a processor 302, a memory 304, and input/output (I/O) interface 306. Processor 302 can be one or more processors and/or processing circuits to execute program code and control basic operations of the device 300. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 302 may include one or more co-processors that implement neural-network processing. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems.

Memory 304 is provided in device 300 for access by the processor 302, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 302 and/or integrated therewith. Memory 304 can store software operating on device 300 by processor 302, including an operating system 308, one or more security application(s) 310, other applications 312, and application data 314. In some implementations, security application(s) 310 can control authentication features and methods as described herein. Security application 310 can include instructions that enable processor 302 to perform functions described herein, e.g., some or all of blocks of method 200 of FIG. 2. In some implementations, data used in security and authentication operations can be stored as application data 314 or other data in memory 304, and/or on other storage devices of one or more other devices in communication with device 300. Other applications 312 may include applications such as a communications application, data display engine, image editing applications, navigation and map applications, notification engine, social networking engine, media display applications, web hosting engines or applications, media sharing applications, etc.

Any of software in memory 304 can alternatively be stored on any other suitable storage location or computer-readable medium. Memory 304 and any other type of storage (magnetic disk, optical disk, magnetic tape, or other tangible media) can be considered "storage" or "storage devices."

I/O interface 306 can provide functions to enable interfacing processor 302 and memory 304 with other components of device 300 and with other devices. Interfaced devices can be included as part of the device 300 or can be separate and communicate with the device 300. For example, network communication devices, storage devices (e.g., memory and/or database), and input/output devices can communicate via I/O interface 306. In some implementations, the I/O interface can connect to interface devices such as input devices (keyboard, pointing device, touchscreen, microphone, camera, scanner, sensors, etc.) and/or output devices (display devices, speaker devices, printers, motors, etc.). In some implementations, hardware used for components of device 100 of FIG. 1 can be included in I/O interface or other connected components of device 300.

Some examples of interfaced devices that can connect to I/O interface 306 can include one or more fingerprint sensors 322 and other sensors 324 (e.g., additional sensors) that can be implemented as any of the sensors described herein (face detection sensor, ambient light sensor, proximity sensor, etc.). For example, sensor data can be sent from sensors 322 and 324 to processor 302 and memory 304 for processing and storage. As described above, the fingerprint data and sensor data used in authentication is provided and processed in a Trusted Execution Environment of the processor and data buses.

One or more display devices 320 can be used to display content, e.g., images, video, and/or a user interface of an application. Display device 320 can be connected to components of device 300 via local connections (e.g., display bus) and/or via networked connections and can be any suitable display device, e.g., a touchscreen as described in FIG. 1, e.g., an LCD, LED, or plasma display screen, CRT, television, monitor, 3-D display screen, or other visual display device. Display device 320 may also act as an input device, e.g., a touchscreen input device such as a flat display screen provided on a mobile device, multiple display screens provided in glasses or a headset device, a monitor screen for a computer device, etc. The I/O interface 306 can interface to other input and output devices (not shown). Some examples include one or more cameras which can capture images and/or detect gestures, one or more microphones for capturing sound such as speech or other sounds emitted from a user, a radar or other sensors for detecting gestures, audio speaker devices for outputting sound, etc.

Any of software in memory 304 can alternatively be stored on any other suitable storage location or computer-readable medium. Memory 304 and any other type of storage (magnetic disk, optical disk, magnetic tape, or other tangible media) can be considered "storage" or "storage devices."

For ease of illustration, FIG. 3 shows one block for each of processor 302, memory 304, I/O interface 306, software blocks 308-316, sensors, etc. These blocks may represent one or more processors or processing circuitries, operating systems, memories, I/O interfaces, applications, devices, components, and/or modules. In other implementations, device 300 may not have all of the components shown and/or may have other elements including other types of elements instead of, or in addition to, those shown herein. While some components are described as performing blocks and operations as described in some implementations herein, any suitable component or combination of components, similar devices, or any suitable processor or processors associated with such a device, may perform the blocks and operations described.

Methods described herein, or portions thereof, can be implemented by computer program instructions or code, which can be executed on a computer. For example, the code can be implemented by one or more digital processors described herein (e.g., microprocessors or other processing circuitry) and can be stored on a computer program product including a non-transitory computer-readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively or additionally, one or more methods or portions thereof can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and an operating system.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement operations of particular implementations. Different programming techniques may be employed, e.g., procedural or object-oriented. The operations may execute on a single processing device or multiple processors. Although steps, operations, or computations may be presented in a specific order, the order may be changed in different particular implementations and/or multiple operations shown as sequential in this specification may be performed at the same time.

The invention claimed is:

1. A computer-implemented method comprising:

obtaining a fingerprint image from a user using a fingerprint sensor of a device;

analyzing the fingerprint image for fingerprint characteristics and determining one or more fingerprint detection scores based on the analyzing, wherein each fingerprint detection score is within a respective score range that includes a respective fingerprint validity threshold;

in response to the one or more fingerprint detection scores meeting the respective fingerprint validity threshold by greater than a respective particular range of the respective fingerprint validity threshold, providing a positive authentication indication;

obtaining respective sensor data from each of a plurality of additional sensors of the device, wherein the plurality of additional sensors include at least one additional sensor selected from the group of: an inertial measurement unit (IMU), an accelerometer, a gyroscope, an ambient light sensor, a proximity sensor, face detection sensor, a touchscreen, and combinations thereof; and in response to at least one of the one or more fingerprint detection scores meeting the respective fingerprint validity threshold within the respective particular range of the respective fingerprint validity threshold:

analyzing the respective sensor data of each additional sensor to determine a respective context score for the additional sensor;

determining whether each of the respective context scores meets a respective context validity threshold associated with a type of the respective sensor data;

in response to determining that the respective context scores meet the respective context validity thresholds, providing the positive authentication indication; and in response to determining that at least one context score does not meet the respective context validity threshold, providing a negative authentication indication.

2. The computer-implemented method of claim 1, wherein obtaining the respective sensor data from each of the plurality of additional sensors includes performing the obtaining the respective sensor data in response to the at least one of the one or more fingerprint detection scores meeting the respective fingerprint validity threshold within the respective particular range of the fingerprint validity threshold.

3. The computer-implemented method of claim 1 wherein analyzing the fingerprint image for fingerprint characteristics includes analyzing the fingerprint image for spoof characteristics using a spoof detection technique, and wherein the one or more fingerprint detection scores includes a spoof score from the spoof detection technique.

4. The computer-implemented method of claim 1, wherein analyzing the fingerprint image for fingerprint characteristics includes comparing the fingerprint image to one or more profile images of the user using a matching fingerprint technique, wherein the one or more fingerprint detection scores includes a match score from the matching fingerprint technique.

5. The computer-implemented method of claim 1, wherein at least one of the context scores is based on one or more patterns in the respective sensor data detected within a particular time period prior to a time of obtaining the fingerprint image.

6. The computer-implemented method of claim 1, wherein one of the additional sensors is the IMU, the accelerometer, or the gyroscope, and wherein one of the context scores is based on motion of the device in a motion pattern indicating that the motion is caused by the user.

7. The computer-implemented method of claim 6, wherein the motion pattern indicating that the motion is caused by the user is based on historical sensor data indicating past motions of the device as detected by the IMU, the accelerometer, or the gyroscope.

8. The computer-implemented method of claim 6, wherein one of the additional sensors is the ambient light sensor, and wherein a second one of the context scores is based on illumination detected by the ambient light sensor in an illumination pattern indicating use of the device by the user.

9. The computer-implemented method of claim 8, wherein the illumination pattern indicating use of the device by the user is based on historical sensor data indicating past illumination detected by the ambient light sensor during previous use of the device.

10. The computer-implemented method of claim 1, wherein one of the additional sensors is the touchscreen, and wherein one of the context scores is based on one or more touch gestures detected on the touchscreen within a particular time period prior to a time of obtaining the fingerprint image.

11. The computer-implemented method of claim 1, wherein one of the additional sensors is the proximity sensor, and wherein one of the context scores is based on whether a proximity detection was detected within a particular time period prior to a time of obtaining the fingerprint image.

12. The computer-implemented method of claim 1, further comprising detecting sensor data from another additional sensor of the device if the respective context scores are within a low confidence range of the respective context validity thresholds.

13. The computer-implemented method of claim 1, wherein analyzing the respective sensor data of each additional sensor and determining whether each of the respective context scores meets the respective context validity threshold are performed in response to:

the at least one fingerprint detection score being within the respective particular range of the respective fingerprint validity threshold, and at least one failed user attempt to be authenticated by the device being detected within a particular time period prior to a time of obtaining the fingerprint image.

14. The computer-implemented method of claim 1, wherein analyzing the respective sensor data of each additional sensor and determining whether each of the respective context scores meets the respective context validity threshold are performed in response to:

the at least one fingerprint detection score being within the respective particular range of the respective fingerprint validity threshold, and the at least one fingerprint detection score being lower than one or more previous fingerprint detection scores determined for previous fingerprint images captured by the fingerprint sensor.

15. The computer-implemented method of claim 1, wherein the context validity thresholds are adjustable and are based on at least one condition selected from the group of:

a number of user attempts to be authenticated by the device within a particular time period prior to a time of obtaining the fingerprint image;

a number of unlocks of the device within a particular time period prior to a time of obtaining the fingerprint image; and combinations thereof.

16. A mobile device comprising:

at least one processor;

a fingerprint sensor coupled to the at least one processor, wherein the fingerprint sensor is configured to provide sensor data to the at least one processor; and a plurality of additional sensors coupled to the at least one processor, wherein the one or more additional sensors are configured to provide sensor data to the at least one processor, wherein the additional sensors include at least one additional sensor selected from the group of: an inertial measurement unit (IMU), an accelerometer, a gyroscope, an ambient light sensor, a proximity sensor, face detection sensor, a touchscreen, and combinations thereof;

wherein the at least one processor is configured to perform operations including:

obtaining a fingerprint image from a user using the fingerprint sensor;

analyzing the fingerprint image for fingerprint characteristics and determining one or more fingerprint detection scores based on the analyzing, wherein each fingerprint detection score is within a respective score range that includes a respective fingerprint validity threshold;

in response to the one or more fingerprint detection scores meeting the respective fingerprint validity threshold by greater than a respective particular range of the respective fingerprint validity threshold, providing a positive authentication indication;

obtaining respective sensor data from each of the additional sensors; and in response to at least one of the one or more fingerprint detection scores meeting the respective fingerprint validity threshold within the respective particular range of the respective fingerprint validity threshold:

analyzing the respective sensor data of each additional sensor to determine a respective context score for the additional sensor;

determining whether each of the respective context scores meets a respective context validity threshold associated with a type of the respective sensor data;

in response to determining that the respective context scores meet the respective context validity thresholds, accepting the fingerprint image as authentic; and in response to determining that at least one context score does not meet the respective context validity threshold, providing a negative authentication indication.

17. The mobile device of claim 16, wherein at least one of the context scores is based on one or more patterns in the sensor data detected within a particular time period prior to a time of obtaining the fingerprint image.

18. The mobile device of claim 16, wherein one of the additional sensors is the IMU, the accelerometer, or the gyroscope, and wherein one of the context scores is based on motion of the device in a motion pattern indicating that the motion is caused by the user.

19. The mobile device of claim 16, wherein the operations of analyzing the sensor data of each additional sensor and determining whether each of the respective context scores meets the respective context validity threshold are performed in response to:

the at least one fingerprint detection score being within the respective particular range of the respective fingerprint validity threshold, and at least one failed user attempt to be authenticated by the device being detected within a particular time period prior to a time of obtaining the fingerprint image.

20. A non-transitory computer-readable medium with instructions stored thereon that, when executed by a processor, cause the processor to perform operations comprising:

obtaining a fingerprint image from a user using a fingerprint sensor of a device;

analyzing the fingerprint image for fingerprint characteristics and determining one or more fingerprint detection scores based on the analyzing, wherein each fingerprint detection score is within a respective score range that includes a respective fingerprint validity threshold;

in response to the one or more fingerprint detection scores meeting the respective fingerprint validity threshold by greater than a respective particular range of the respective fingerprint validity threshold, providing a positive authentication indication;

obtaining respective sensor data from each of a plurality of additional sensors of the device, wherein the plurality of additional sensors include at least one additional sensor selected from the group of: an inertial measurement unit (IMU), an accelerometer, a gyroscope, an ambient light sensor, a proximity sensor, face detection sensor, a touchscreen, and combinations thereof; and in response to at least one of the one or more fingerprint detection scores meeting the respective fingerprint validity threshold within the respective particular range of the respective fingerprint validity threshold:

analyzing the respective sensor data of each additional sensor to determine a respective context score for the additional sensor;

determining whether each of the respective context scores meets a respective context validity threshold associated with a type of the respective sensor data;

in response to determining that the respective context scores meet the respective context validity thresholds, accepting the fingerprint image as authentic; and in response to determining that at least one context score does not meet the respective context validity threshold, providing a negative authentication indication.

* * * * *